United States Patent
Bush

(10) Patent No.: US 7,366,185 B2
(45) Date of Patent: Apr. 29, 2008

(54) SYSTEM FOR EVOLUTIONARY SERVICE MIGRATION

(75) Inventor: Stephen F. Bush, Latham, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 705 days.

(21) Appl. No.: 10/770,694

(22) Filed: Feb. 3, 2004

(65) Prior Publication Data

US 2004/0156333 A1 Aug. 12, 2004

Related U.S. Application Data

(60) Provisional application No. 60/445,579, filed on Feb. 7, 2003.

(51) Int. Cl.
*H04L 12/28* (2006.01)
*H04L 12/56* (2006.01)
*H04Q 7/24* (2006.01)

(52) U.S. Cl. ............ 370/400; 370/401; 370/402; 370/338

(58) Field of Classification Search ............ 370/331, 370/255, 311, 312, 400–402, 369, 256, 338 370/328; 455/450–453, 69
See application file for complete search history.

(56) References Cited

U.S. PATENT DOCUMENTS

| | | | |
|---|---|---|---|
| 5,987,011 A | 11/1999 | Toh | |
| 6,104,712 A | 8/2000 | Robert et al. | |
| 6,130,881 A | 10/2000 | Stiller et al. | |
| 6,215,771 B1 | 4/2001 | Turner et al. | |
| 6,304,556 B1 | 10/2001 | Haas | |
| 6,529,515 B1 * | 3/2003 | Raz et al. | 370/401 |
| 2001/0047407 A1 | 11/2001 | Moore et al. | |
| 2002/0031131 A1 | 3/2002 | Yemini et al. | |
| 2002/0101822 A1 | 8/2002 | Ayyagari et al. | |
| 2002/0122410 A1 | 9/2002 | Kulikov et al. | |
| 2002/0133534 A1 | 9/2002 | Forslow | |
| 2002/0147771 A1 | 10/2002 | Traversat et al. | |
| 2002/0156893 A1 | 10/2002 | Pouyoul et al. | |
| 2002/0188656 A1 | 12/2002 | Patton et al. | |
| 2002/0191573 A1 | 12/2002 | Whitehill et al. | |
| 2002/0196789 A1 | 12/2002 | Patton | |
| 2002/0198994 A1 | 12/2002 | Patton et al. | |
| 2003/0005102 A1 | 1/2003 | Russell | |

(Continued)

OTHER PUBLICATIONS

"Optimizing Clustering Algorithm in Mobile Ad hoc Networks Using Genetic Algorithmic Approach", D. Turgut, S. K. Das, R. Elmasri & Be. Turgut, http://www.cs.ucf.edu/~turgut/published_papers/globecom2002_cr.pdf.

(Continued)

*Primary Examiner*—Matthew Anderson
*Assistant Examiner*—Eugene Yun
(74) *Attorney, Agent, or Firm*—Ronald E. Prass, Jr.; Prass & Irving, LLP

(57) ABSTRACT

A system in accordance with the present invention operates a wireless ad hoc network. The system includes a plurality of nodes and a plurality of protocols for governing transmission of data between the plurality of nodes. A first node of the plurality of nodes executes an evolutionary service migration algorithm for transferring a service from the first node to one of the remaining of the plurality of nodes.

9 Claims, 2 Drawing Sheets

U.S. PATENT DOCUMENTS

| | | |
|---|---|---|
| 2003/0005149 A1 | 1/2003 | Haas et al. |
| 2003/0007481 A1 | 1/2003 | Wada et al. |
| 2003/0012168 A1 | 1/2003 | Elson et al. |
| 2003/0033394 A1 | 2/2003 | Stine |
| 2003/0041042 A1 | 2/2003 | Cohen et al. |
| 2003/0041141 A1 | 2/2003 | Abdelaziz et al. |
| 2003/0058886 A1 | 3/2003 | Stanforth et al. |
| 2003/0065712 A1 | 4/2003 | Cheung et al. |

OTHER PUBLICATIONS

"On the Need for System-Level Support for Ad hoc and Sensor Networks", R. Barr, J. C. Bicket, D. S. Dantas, B. Du, T. W. Danny Kim, B. Zhou & E. G. Sirer, http://www.cs.cornell.edu/People/egs/papers/magnetos-osr.pdf, date unknown.

* cited by examiner

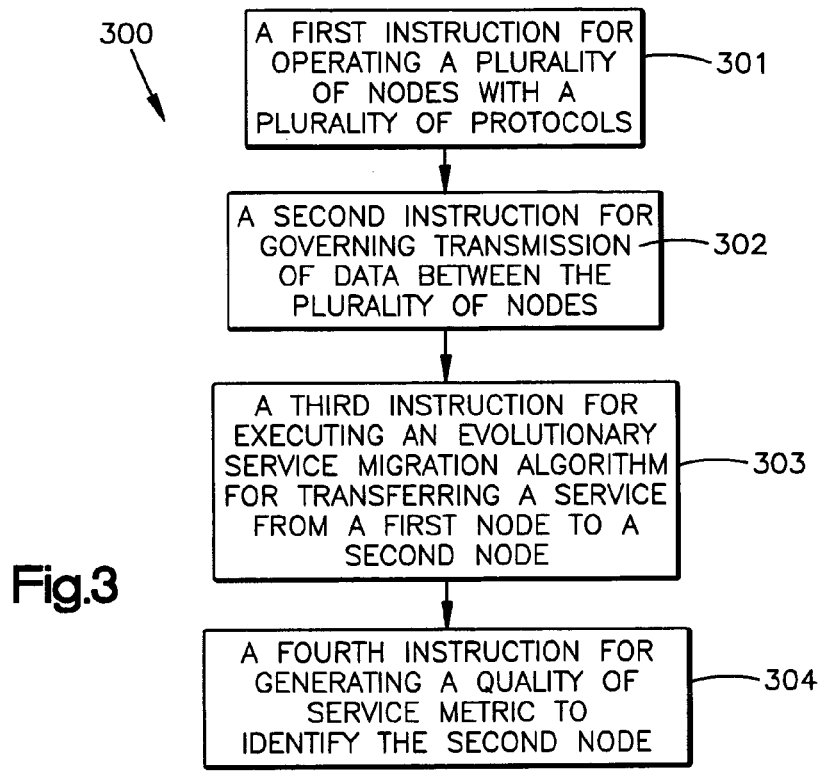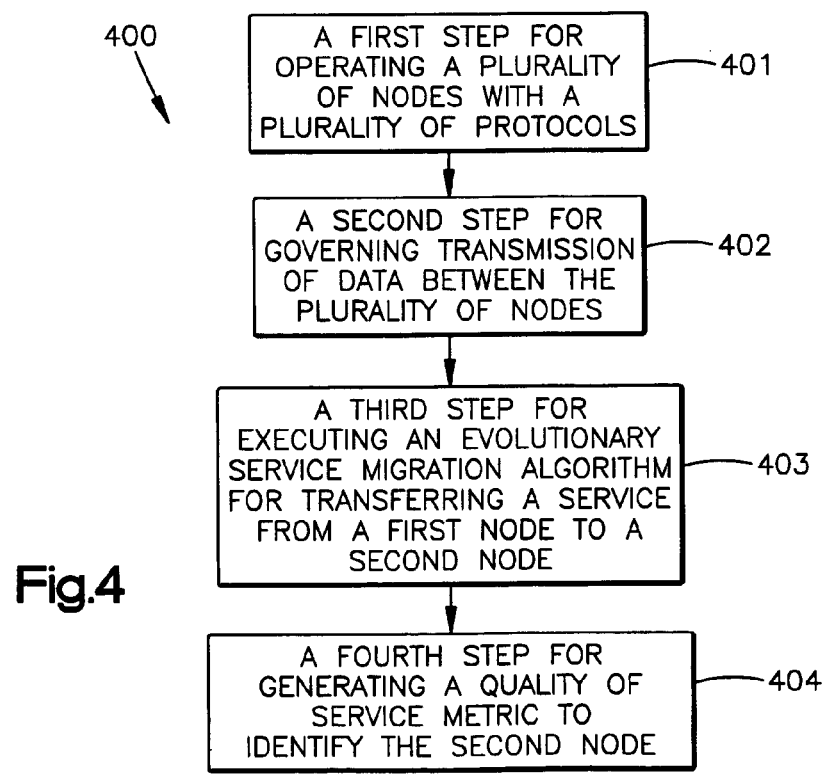

SYSTEM FOR EVOLUTIONARY SERVICE MIGRATION

RELATED APPLICATION

This application claims the benefit of U.S. Provisional Application No. 60/445,579, filed Feb. 7, 2003.

FIELD OF INVENTION

The present invention relates to a system for evolutionary service migration within a wireless network, and more specifically, to a system for determining a quality of service metric for determining a next hop location of services within the wireless network.

BACKGROUND OF THE INVENTION

Dynamic Ad-Hoc Wireless Networks (DAHWNs) are a subset of variable topology networks. The goal of variable topology networks is to maintain message delivery as the network topology varies. Network nodes should be able to dynamically form transient networks. Nodes, which may be located on rapidly moving platforms such as aircraft, should be able to join, leave, and re-join networks which may form at any time. Networks spontaneously form and their topologies may change rapidly or almost immediately. An additional challenge required by airborne and heterogeneous air and ground environments is the ability to provide predictable and optimized Quality of Service (QoS) of data transmission over variable topologies.

In order to provide predictable and optimal Quality of Service (QoS) in Dynamic Ad-Hoc Wireless Networks, network architecture must support dynamic adaptation to the rapidly changing environment. The degree to which the network must adapt is dependent on the rate of change of the topology. QoS requirements are most often stated in the form of an optimization problem with a cost function that is optimized by adaptation within the network. An applicable result from complexity theory, a No Free Lunch Theorem, expresses a limit on the ability of any single algorithm, or protocol, to meet QoS requirements. The No Free Lunch Theorem states that all algorithms perform exactly the same, searching for an extremum, when averaged over all cost functions. If a potentially good algorithm appears to outperform poor algorithm on some cost functions, then there exist exactly as many functions where the apparent poor algorithm will outperform the good algorithm. In other words, no single algorithm, or ad-hoc protocol, can optimize all potential QoS requirements.

There are two forms of adaptation of protocols: 1) an algorithm that remains fixed, but includes tunable parameters and 2) an algorithm whose fundamental operation changes. Most conventional theory has focused upon the fixed, but tunable adaptation. In other words, current research is seeking a fixed algorithm with enough degrees of freedom such that optimal operation may be found by tuning a fixed set of parameters. This may be due in part to the difficulty in breaking away from the fixed operation of the Internet Protocol that has a strong grip on the mind-set of most researchers. Great potential exists in examining the latter form of adaptation, particularly in light of the implication of the No Free Lunch Theorem which indicates that simply tuning a given algorithm will not be as optimal as changing the algorithm itself.

Two high-level frameworks that are flexible and customizable enough to allow dynamic change in algorithmic content within networks are: Programmable Networks and Active Networks. A Programmable Network allows control software of the network to be dynamically reprogrammed. An Active Network is an extreme form of programmable network that allows code and data to travel through the network, often in the same packet structure. Active packet code may execute on any node along the path that the packet travels. Active networks may service both mobile and ad-hoc networks. One challenge that must be addressed is the mismatch among adaptation of individual layers of Internet Protocol (IP) and improving the adaptation to suit the characteristics of wireless and ad-hoc network environments.

The most significant gap that has been identified with regard to adaptation within ad-hoc networks is the lack of synergistic adaptation among network layers. Early network implementation focused upon network layering as a mechanism for partitioning computer communications into a set of tractable sub-tasks.

Layering has resulted in many forms of adaptation occurring simultaneously within the network. At times, adaptation in one layer (e.g., congestion control) may occur in a manner antithetical to adaptation in another layer (e.g., route repair). A "meta"-adaptation view, namely how adaptive mechanisms work together, is extremely important for an ad-hoc network environment, but is currently lacking.

One conventional attempt to correct this deficiency is Explicit Link Failure Notification. Congestion and routing each try to adapt based upon limited knowledge of each other, resulting in sub-optimal global behavior. Another example of sub-optimal adaptation behavior is MAC to IP layer address resolution.

Non-layered ad hoc communication in sensor networks may also provide useful information. A sensor network tends to assume large numbers of constrained sensor devices that transmit asymmetrically to a central location. However, ad hoc routing must be implemented on the sensors using as little power and processing as possible. This has resulted in fewer network layers and better in-network utilization via active networking.

SUMMARY OF THE INVENTION

A system in accordance with the present invention operates a wireless ad hoc network. The system includes a plurality of nodes and a plurality of protocols for governing transmission of data between the plurality of nodes. A first node of the plurality of nodes executes an evolutionary service migration algorithm for transferring a service from the first node to one of the remaining of the plurality of nodes.

A computer program product in accordance with the present invention transfers a service across a wireless ad hoc network. The computer program product includes: a first instruction for operating a plurality of nodes with a plurality of protocols; a second instruction for governing transmission of data between the plurality of nodes; a third instruction for executing an evolutionary service migration algorithm for transferring the service from a first node to a one of the remaining of the plurality of nodes; and a fourth instruction for generating a Quality of Service metric for determining to which of the remaining plurality of nodes to transfer the service from the first node.

A method in accordance with the present invention transfers a service across a wireless ad hoc network. The method comprises the steps of: operating a plurality of nodes with a plurality of protocols; governing transmission of data between the plurality of nodes; executing an evolutionary service migration algorithm for transferring the service from a first node to a one of the remaining of the plurality of nodes; and generating a Quality of Service metric for determining which of the remaining plurality of nodes to transfer the service from the first node.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic representation of an example system in accordance with the present invention; and FIG. 4 is a schematic representation of another example system in accordance with the present invention.

DESCRIPTION OF AN EXAMPLE EMBODIMENT

Figure 1:
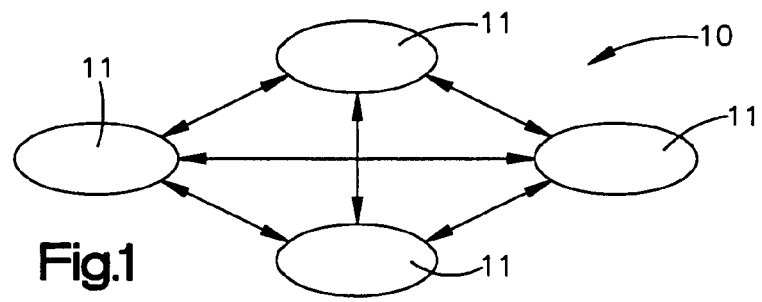
FIG. 1 is a schematic representation of an example system for use with the present invention.

A system 10 in accordance with the present invention provides evolutionary service migration within a wireless network. The system 10 utilizes a quality of service metric for determining the routing of services within the wireless network from node 11 to node 11 (FIG. 1).

Load balancing algorithms currently exist and could be used to help determine optimal placement of services and routing within an ad-hoc network. Caching data to improve performance may also occur within the network. However, a dynamic ad-hoc wireless network will typically add additional undesirable changes in optimizing cache locations within the network. Active caches are caches implemented within active networks with the capability to migrate from node 11 to node 11 (FIG. 1). Active caches are a potential solution to this problem.

As evidence of the applicability of the No Free Lunch Theorem, described above, many alternative ad-hoc routing protocols exist. Each protocol is optimal under different conditions. The choice of protocol itself may be considered an adaptable parameter. Multiple routing protocols may be combined within the same network.

Additional metrics that characterize the performance of the dynamic ad hoc wireless network need to be precisely defined. These metrics should be used to guide the development of the DAHWN architecture. A mathematical model for working with highly dynamic variable topology networks may be created and used to examine the architectural tradeoff decisions for DAHWN. The model may be compared and contrasted with a dynamic mobile ad-hoc network simulation.

A highest-level performance metric may be qualitatively stated as the degree to which the system is able to meet any reasonable Quality of Service (QoS) requirement regarding the transmission and reception of information over a variable topology network. QoS requirements may be specifically defined as potential trade-offs of traditional networking requirements such as throughput, delay, and degree of information assurance, For example, these requirements are particularly crucial to meeting military requirements. A QoS metric defining the best possible QoS achievable in a rapidly changing variable topology environment may be introduced to the system.

A system in accordance with the present invention requires improvement in conventional ad-hoc network capabilities. Code itself must be capable of change, as well as inter-node code transport, deep within network infrastructure. The ability of the code itself to adapt makes the system extremely flexible and resilient. Code migration within the network must also be supported by the network infrastructure.

Figure 2:
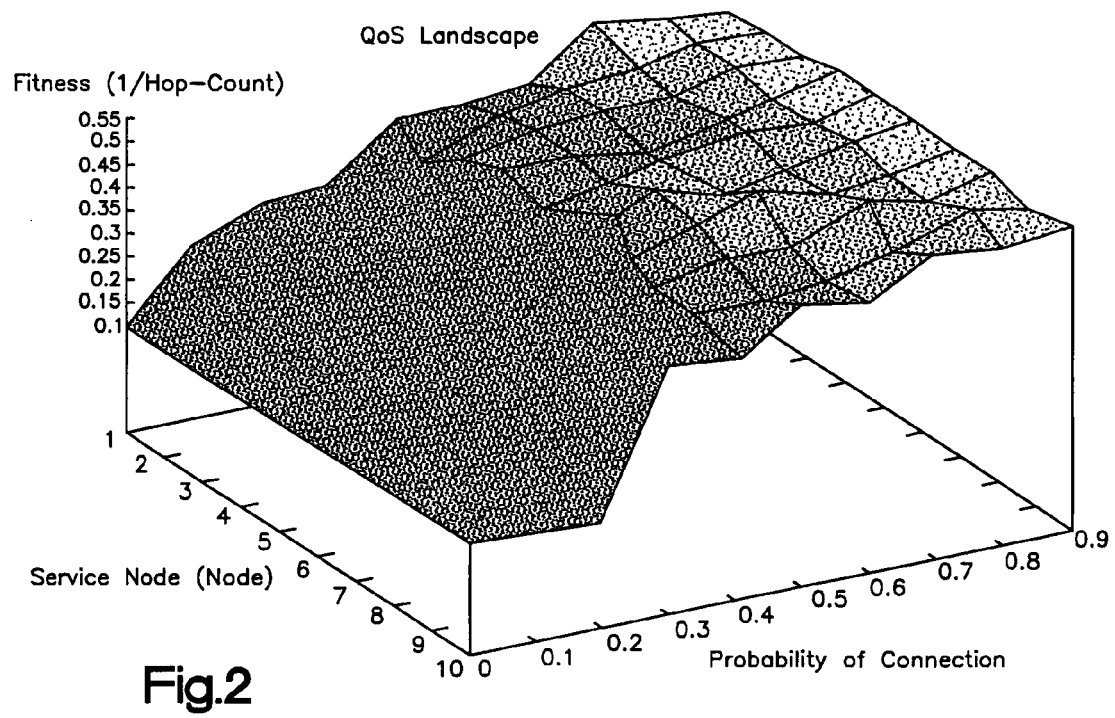
FIG. 2 is a schematic representation of the topology of a network landscape for use with the present invention.

A service migration wrapper may be implemented that dynamically maintains a network of application service at an optimal location within a dynamic ad hoc wireless network. The service migration wrapper may be envisioned as floating along the QoS landscape of FIG. 2, always attempting to climb to the highest point.

Because DAHWNs are highly dynamic, a metric is required that relates the degree of dynamism within the ad hoc network to the QoS. Dynamism is the complexity and rate of change of the variable topology of the network. Specifically, an important property is how quickly the system may adapt as a function of the complexity and rate of change of the topology. A specified set of force vectors may be applied to each network node 11. Thus, a velocity and direction may be applied to each node 11 and the network's characteristics may be monitored as the system responds to the varying complexities.

Another metric of the DAHWN architecture may be defined as the speed and degree to which the network may dynamically change algorithms, or protocols. As described above, based on the No Free Lunch Theorem, it is impossible to use a single algorithm, or protocol to meet all possible QoS requirements likely to be requested by a reasonable user under reasonable operating conditions. However, as DAHWN requirements demonstrate, the envelope of what will be considered reasonable, particularly under military conditions, will be constantly expanding. The DAHWN architecture has the goal of eliminating inefficiency caused by competing fitness requirements. Multiple users may have potentially competing fitness requirements within a single protocol or application. Also, multiple protocol layers in the same protocol stack may demonstrate inefficiencies due to competing fitness requirements that become highly exacerbated in a dynamic ad hoc environment.

Adaptation may be defined as autonomic change in network state designed to maintain optimal communication performance. Most network functionality falls under some form of adaptation. Algorithms are conventionally defined before installation into the network. These algorithms developed to meet high performance standards for specific predefined cases within the network. These algorithms do not have the flexibility, or adaptability, required to meet unanticipated conditions. However, a system in accordance with the present invention defines adaptation to be a self-directed change in an algorithm, or program code itself, designed to maintain an optimal performance. Adaptation is thus a self-directed change in an algorithm, or program code, designed to maintain optimal ad-hoc network performance.

The ability of the dynamic ad hoc wireless network to maintain a service at the optimal location is another metric. Because the nodes 11 are mobile, and because the direction and velocity of the nodes may be highly variable, nodes will often be unreachable. In this case, a penalty is assigned for 'no quality of service'. The metric is the precision versus overhead with which the DAHWN is able to maintain a location for the service that maximizes overall QoS normalized by the amount of dynamism in the network topology.

The system 10 further defines a QoS metric that characterizes the performance of the network to transmit information from any node 11 to any other node 11. Because nodes 11 are mobile, not all nodes will form a single network at any given time. The QoS metric is a measure of a single service, residing at a node 11 within the network that may deliver the best possible service to all nodes, or may deliver that service to every node in the network. The more disconnected the network is, the worse the QoS metric becomes.

The system 10 further defines a route discovery time (RDT). RDT, or more generally, a route acquisition time with reactive protocols, is a specific metric that is critical in a variable topology network. RDT is influenced by the location announcement interval (i.e., beaconing, hello messages, etc.). The system may also consider end-end delay and throughput. These metrics may be influenced by packet loss rate, route reconstruction time, and routing overhead, which are additional metrics.

The QoS metric may be defined as ability of the ad hoc network to maintain a single service in any optimal location within the network as the network topology changes. In theory, the optimal location may be determined at all times. The deviation from optimal location, by any ad hoc network being evaluated, versus the overhead in maintaining the optimal location, and rate of change of network topology is a measure of ad hoc network performance. Rate of change of network topology is measured as the average rate of change of network diameter in units of "hops". The average deviation of a single service from optimal location is also measured in "hops". Thus, a dimensionless performance metric results, referred to as the Bush metric.

The system 10 in accordance with the present invention seeks to optimize the location of ad-hoc network services. The system 10 implements a migration mechanism based upon fitness and mutation. Service quality is inversely related to the number of hops between client and service nodes 11. Fitness is the average distance, in hops, between the service location and each reachable node 11. Nodes 11 are assumed to be mobile with links transiently existing. Network connectivity varies based upon a specified probability of connection.

The primary simplifying assumption in a surprisingly simple, widely applicable model is that QoS is inversely related to hop-count. Hop-count is the number of hops from source to destination in the variable topology network. The QoS metric, or fitness in evolutionary terms, is the average hop-count of client node 11 from the nearest service node 11. Nodes 11 are mobile and capable of forming ad-hoc sub-networks having a given probability of connection. In order to fully define the QoS metric, a fitness value needs to be assigned to clients whose QoS may not be satisfied. In this case, an arbitrarily large hop-count may be defined as a penalty.

A simple example case is to consider the fitness of an ad-hoc network to have the highest QoS when a single server is located at the optimal service node location and attempts to provide service to all nodes 11 in the network. Finding the optimal service location in a DAHWN network in a low-overhead manner is a challenge given the constantly changing network topology.

A large impact occurs as the network topology changes due to mobility and other environmental factors. When the network is highly connected, a fitness surface remains smooth over time because efficient routes to any service location are available. As connectivity is impacted, service location becomes more critical. A highly connected network is characterized by a smooth fitness surface. Lower probability of connection of a more disconnected network yields a more rugged fitness surface.

The mechanism used to discover the optimal location in a network begins by injecting a service into a random location. A service location algorithm searches the landscape via an evolutionary algorithm. A set of candidate nodes 11, which are most likely to result in best overall service, is determined by mutation from the node upon which the service currently resides. The mutation distance and rate are applied to the node 11 hop-count metric. Distance is the number of hops away that the service moves, while rate is how often the mutation occurs. Memory of QoS in previous locations serves as a population. The following symbols may be used to define the evolutionary algorithm. $\alpha$ identifies a Client. In the following example analysis, a single client per node is considered. Thus, this represents a client node 11. $\theta_\alpha$ is a Client Service Threshold. This is the minimum acceptable client quality of service. Ø is a Service Fitness. This is the overall fitness of the service being offered for all reachable clients.

Θ is a Minimum Acceptable Service Fitness) This is an aggregate minimum acceptable Quality of Service for all clients. T is Time. This is the amount of time since the QoS was last measured. v is a Node Identifier. This identifies a particular node. If Ø<θ, then service migration may be necessary. The goal is to maximize Ø.

$\{(v,Ø)_t\}$ is a QoS Table. This is a sequence of nodes with a Quality of Service if the service resides upon that node. $\max_Ø \{(v,Ø)_t\}$ is a Best Service Node. This is the node chosen from the QoS Table that would provide the maximum Quality of Service. This is used to choose the best parent node for performing a mutation. is Mutation Distance. This is the maximum hop-count allowed from the current service node, when choosing a next candidate service node. A large mutation distance results in a larger possible search space, but also can result in more location query and movement overhead.

P is Rate of Evolution. This is the rate at which the evolutionary algorithm executes. Running the algorithms at a high rate is likely to increase overall Quality of Service at the expense of greater overhead. Running the evolutionary algorithm faster than the rate of change of the network or of the ability of the network to adapt to network changes (i.e., Hello Frequency) would be wasteful.

As an example, the service may initially reside on a randomly selected node. The system may select a small set of new candidate service nodes via mutation, controlled by mutation rate (p) and mutation distance ( ). Next, system may update the QoS sliding window sequence $\{(v,Ø)_t\}$ with the candidate service nodes' QoS metrics. The system may choose service nodes in the sequence with the best fitness for further mutation. The system removes older, expired sequence values. The evolutionary service migration function generates results showing the increase in quality that was learned as a function of evolutionary time steps.

Optimal service location overhead is defined as the processing and bandwidth required by the service location algorithm. The system further defines an overhead/fitness ratio. The evolutionary algorithm may run continuously. Alternatively, the evolutionary algorithm may be slowed as a mean QoS is satisfied. Evolution rate can also be based upon a network topological rate of change. Either of these mechanisms clearly has less overhead than continuously polling all nodes to determined optimal location.

Ad-hoc network algorithms may require a means of discovering when the network topology changes. This discovery is often implemented by broadcasting an announcement of some type, often termed a beacon or hello message. Frequency broadcasts improve accuracy, but also consume bandwidth. This becomes extremely critical in a highly dynamic network because changes may be frequent. Partitioning of networks into sub-networks increases and the maximum network size decreases. Although greater portioning occurs, the benefit is that hello announcement bandwidth usage is reduced.

Given a single service capable of migration, whose service is required by nodes throughout the entire network, the optimal location for that service may be determined via using two mechanisms. The first mechanism requires the service to determine its optimum location by polling all reachable nodes and move to the node that provides the best QoS for all nodes. This algorithm may be labeled Poll All Nodes. The second mechanism is based upon evolutionary control. This mechanism may be labeled Evolutionary Polling. The evolutionary algorithm may yield less than optimal QoS, but with much less location overhead messages (polling).

QoS may unexpectedly be greater using the evolutionary approach when compared to a brute-force polling of all nodes. The reason for this is due to the fact that the service did not always migrate to the best node within its local sub-network. This particular service node may then leave the smaller network and join part of a larger sub-network. The service then gradually migrates to an optimal location within that larger sub-network yielding a better QoS. Thus, optimization for a local sub-network may yield worse global performance.

Four service migration example cases may be considered. Firstly, in No Service Migration, a single service is tied to a single, specific node. Secondly, in Naïve Service Migration, a single service polls all network nodes in order to determine optimal next move. Thirdly, in Evolutionary Service Migration, a single service follows landscape towards peaks. Fourthly, in Perfect Migration, a single omniscient service always moves to the best location without inducing any overhead. Simplifying assumptions for these example may be QoS inversely related to hop count, polling overhead (poll rate, poll packet size, hops to reach node being polled) adds load to the network and impacts service performance, reduction in QoS is dependent upon poll rate * poll packet size * hops, and single poll packet load is 1% of link capacity.

No Service Migration shows a large decrease in QoS, while Perfect Migration and Evolutionary Service Migration show better QoS. The goal of DAHWN architecture is to provide maximum flexibility and adaptability to maintain maximum performance in the face of extreme changes experienced in a dynamic ad-hoc network. Therefore, the guiding principle behind the architecture is that of "soft connection state". This means that, unlike the traditional networking paradigm, the state of the network is always expressed in terms of its attributes instead of explicit names. For example, the end-points of any connection are not described as (host, port) pairs but by the service provider and service consumer attributes. This enables the service provider to change without the consumer having to reset its connection state.

The DAHWN architecture consists of a minimal Internet Protocol (IP) layer and an active network (or programmable network) overlay. The IP layer is retained for compatibility to legacy applications as well as to lower layers of the protocol stack. The Active Network Execution Environment provides the overlay on top of the IP layer to provide flexible, composable protocols or protocol stacks to be injected into the network. In the extreme case, only the above two layers are required to be present on any DAHWN node. The other layers may be dynamically bootstrapped into the node as necessary through a separate bootstrap mechanism. The service migration capability of a system in accordance with the present invention may be implemented in the active network layer.

In accordance with the present invention, a computer program product 300 transfers a service across a wireless ad hoc network (FIG. 3). The computer program product 300 includes: a first instruction 301 for operating a plurality of nodes with a plurality of protocols; a second instruction 302 for governing transmission of data between the plurality of nodes; a third instruction 303 for executing an evolutionary service migration algorithm for transferring a service from a first node to a one of the remaining of the plurality of nodes; and a fourth instruction 304 for generating a Quality of Service metric for determining to which of the remaining plurality of nodes to transfer the service from the first node.

In accordance with the present invention, a method 400 transfers a service across a wireless ad hoc network (FIG. 4). The method 400 comprises the steps of: operating 401 a plurality of nodes with a plurality of protocols; governing 402 transmission of data between the plurality of nodes; executing 403 an evolutionary service migration algorithm for transferring a service from a first node to a one of the remaining of the plurality of nodes; and generating 404 a Quality of Service metric for determining to which of the remaining plurality of nodes to transfer the service from the first node.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multiprocessor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

I claim:

1. A system for operating a wireless ad hoc network, the system comprising:
    a plurality of nodes; and
    a plurality of protocols that govern transmission of data between the plurality of nodes, a first node of the plurality of nodes executing an evolutionary service migration algorithm for transferring a service from the first node to a one of the remaining of the plurality of nodes, wherein the first node generates a Quality of Service metric for determining to which of the remaining plurality of nodes to transfer the service and the evolutionary service migration algorithm produces a metric representing a degree of dynamism of the wireless ad hoc network as the degree of dynamism relates to the Quality of Service metric, and wherein dynamism is defined as complexity and rate of change of a variable topology of the wireless ad hoc network,
    wherein the evolutionary service migration algorithm autonomously adapts to unanticipated changes to the topology of the network and autonomously assigns an arbitrary value to a node that cannot be reached by the service.

2. The system as set forth in claim 1, wherein the service includes code that adapts to the operation of the node to which the service is transferred.

3. The system as set forth in claim 1, further comprising:
    a service migration wrapper for dynamically maintaining the service at an optimal location within the network.

4. The system as set forth in claim 1, wherein a specified set of force vectors are assigned to each of the plurality of nodes by said plurality of protocols.

5. The system as set forth in claim 1, wherein the Quality of Service metric characterizes the performance of the network to transmit information from the first node to the remaining of the plurality of nodes.

6. The system as set forth in claim 1, further comprising: a mechanism for evolutionary polling of some of the plurality of nodes.

7. A method for transferring a service across a wireless ad hoc network, the method comprising the steps of:
   operating a plurality of nodes with a plurality of protocols;
   governing transmission of data between the plurality of nodes;
   executing an evolutionary service migration algorithm for transferring the service from a first node to a one of the remaining of the plurality of nodes;
   generating a Quality of Service metric for determining to which of the remaining plurality of nodes to transfer the service from the first node, wherein the evolutionary service migration algorithm produces a metric representing a degree of dynamism of the wireless ad hoc network as the degree of dynamism relates to the Quality of Service metric, and wherein dynamism is defined as complexity and rate of change of a variable topology of the wireless ad hoc network;
   autonomously adapting the evolutionary service migration algorithm to unanticipated changes to the topology of the network; and
   autonomously assigning an arbitrary value to a node that cannot be reached by the service.

8. The method as set forth in claim 7, further comprising: characterizing the performance of the network to transmit information from the first node to the remaining of the plurality of nodes with the Quality of Service metric.

9. The method as set forth in claim 7, further comprising: polling at least one of the plurality of nodes.

\* \* \* \* \*